Feb. 17, 1970          W. KASTEN          3,496,047
APPARATUS FOR FORMING FILTER TUBING
Filed Feb. 10, 1966
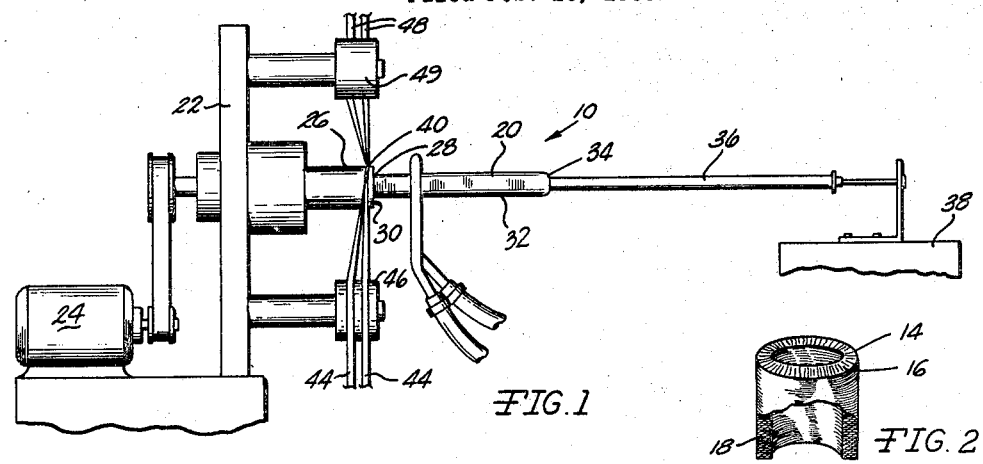
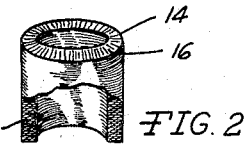
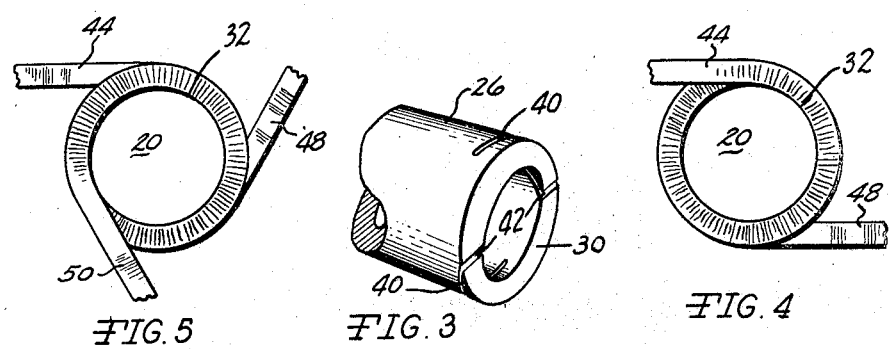
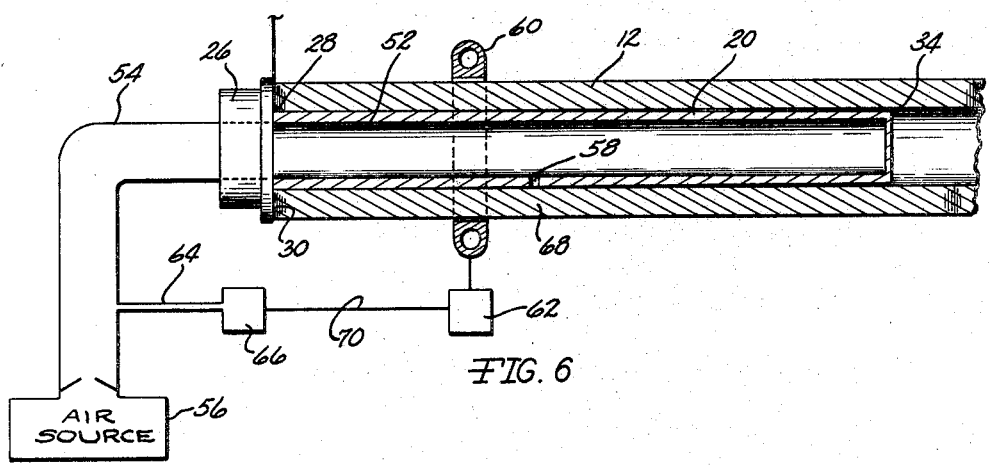
INVENTOR
WALTER KASTEN
BY *James L. O'Brien*
ATTORNEY United States Patent Office 3,496,047
Patented Feb. 17, 1970

3,496,047
APPARATUS FOR FORMING FILTER TUBING
Walter Kasten, Franklin, Mich., assignor to The Bendix Corporation, a corporation of Delaware
Filed Feb. 10, 1966, Ser. No. 526,615
Int. Cl. B31c *13/00;* B32b *33/00*
U.S. Cl. 156—360                                           9 Claims

ABSTRACT OF THE DISCLOSURE

An apparatus for forming edge type filter tubing from pairs of strips, including a slotted collar for guiding the strips, a pressure face for compacting already wound strips and forcing them along a mandrel, and filter porosity regulating means.

---

This invention relates generally to the manufacture of tubular filter elements made from helically wound crepe strips which are fused together and more particularly to improved apparatus for manufacturing tubing which is cut to the desired lengths to form these filter elements.

Filter elements of the type to which this invention relates have heretofore been manufactured as follows: (1) Crepe paper strips or ribbons impregnated with a phenolic resin are wound edgewise and helically onto a continuously rotating mandrel so as to continuously form filter tubing on the mandrel. Two strips of paper are fed simultaneously onto the rotating mandrel, with these strips being arranged side by side and fed edgewise onto the mandrel along a path which is substantially tangent to the mandrel surface. (2) The tubing on the mandrel is subjected to heat as it is being formed to cure the phenolic resin sufficiently to form a self-sustaining tube structure. (3) Lengths of the tubing are periodically cut off and removed from the mandrel following which they are subjected to another heating operation to finally cure the resin. (4) The finally cured tubing is then cut to the lengths desired for the filter elements, and each element is subjected to a separate porosity testing procedure, following which the elements having porosities within predetermined limits are packaged. The completed filter elements which are outside the desired porosity limits are scrapped since they have no value. Apparatus for forming filter tubing in this manner has, up to the present time, been satisfactory. It is the principal object of this invention to provide improved apparatus for manufacturing filter elements of this type which provides for manufacture of the tubing at a faster rate of speed and with a constant indication of the porosity of the filter tubing as it is being formed, in contrast to scrapping filter elements which do not have the desired porosity after the manufacture of the elements has been completed.

It is a further object of this invention to provide improve apparatus for manufacturing filter tubing in which the tubing is finally cured as it is being formed on the mandrel and the curing is controlled so as to maintain the tubing of the desired porosity.

Further objects, features and advantages of this invention will become apparent from a consideration of the following description, the appended claims, and the accompanying drawing in which:

FIGURE 1 is an illustrative side elevational view of improved apparatus of this invention;

FIGURE 2 is a perspective view of a filter element which can be manufactured with the apparatus of this invention, with part of the element being broken away for purposes of clarity;

FIGURE 3 is a perspective view of a collar used in the apparatus of this invention to guide the paper strips onto the mandrel;

FIGURE 4 is a diagrammatic view illustrating the improved feeding of paper strips onto the mandrel according to this invention;

FIGURE 5 is a view similar to FIG. 4 illustrating a different improved feeding of paper strips onto the mandrel according to this invention; and FIGURE 6 is a diagrammatic view illustrating portion of the improved apparatus of this invention in greater detail.

With reference to the drawing the apparatus of this invention, indicated generally at 10, is illustrated in FIG. 1 for continuously forming filter tubing illustrated at 12 in FIG. 6 which is subsequently cut to desired lengths to form tubular filter elements of the type indicated at 14 in FIG. 2. As shown in FIG. 2, the element 14 consists of one or more crepe strips 16 which are wound edgewise and helically into the tubular shape illustrated. The strips 16 are of a width corresponding to the desired thickness of the wall 18 of the filter element 14, and are illustrated as being formed from crepe paper impregnated with a thermosetting phenolic resin, since this is the present practice. It is to be understood, however, that other materials, such as plastic, can be used to form the strips 16. The crepe paper strips 16 are formed so that the crepe or wrinkles in the paper run crosswise of the paper, so that small pores or openings are formed between adjacent layers of the element 14. The size and number of these pores is dependent upon the surface roughness of the crepe paper, the number of crepe lines per inch, and also upon the tightness with which the layers are packed against each other. Stated otherwise, the tighter the coils from the strip 16 are packed against each other, the greater the density of the wall 18 and thus the lower the porosity of the wall 18. The tubing 12 formed from the helically wound strips 16 is then heated sufficiently to cause the resin in the paper strips to flow and cure so as to bond abutting high spots in the adjacent coils in the tubing. Thus, the strips 16 can be formed from any suitable material characterized by its being windable helically into a tubular form adjacent coils of which are bondable, at the high spots (created by the crepe), to each other in the presence of heat. Insofar as the present invention is concerned, therefore, while the apparatus is particularly described with respect to crepe paper strips, it is to be understood that other materials having the above characteristic are usable.

In the apparatus of this invention, a mandrel 20 is mounted on a frame 22 for continuous rotation of the mandrel about its axis in response to operation of a driving motor 24. A stationary collar 26 is mounted on the frame 22 so that it extends about what will be hereinafter referred to as one end 28 of the mandrel 20. The collar 26 has an end face 30, hereinafter referred to as a pressure face, which is substantially perpendicular to the peripheral surface 32 of the mandrel 20. The opposite end 34 of the mandrel is shown connected to a support rod 36 which is mounted at its opposite end on a stationary frame 38 so that the rod 36 can readily be detached from the frame 38 and the mandrel 20. The purpose of the rod 36 is to receive filter tubing formed on the mandrel 20. This tubing is periodically cut beyond the end 34 of the mandrel 20 and removed along with the rod 36 to a storage area. The rod 36 is then replaced on the mandrel 20 and the frame 38 so that it is in a position illustrated in FIG. 1 for receiving a subsequent length of tubing from the mandrel 20.

The collar 26 is formed adjacent the pressure face 30 with a plurality of slots 40 (FIG. 3), illustrated as being two in number, with each slot 40 terminating at the pressure face 30 in a slit portion 42 the width of which is tangent to a point on the peripheral mandrel surface 32.

A pair of crepe paper strips or ribbons 44, impregnated with the phenolic resin heretofore described, extend from a suitable supply reel (not shown) over a guide roller 46 supported on the main frame 22 and through one of the slots 40 and are trained edgewise around the mandrel 20. A second pair of strips 48 extend from similar reels (not shown) over another guide roller 49, through the other slot 40 and edgewise onto the mandrel 20.

As best appears in FIG. 4, the pair of strips 44, which are arranged side by side as they travel edgewise onto the mandrel 20, are disposed 180° from the strips 48 at the points on the mandrel periphery 32 where the strips 44 and 48 first contact the mandrel. The strips 48 are similarly arranged side by side with each other, as they are trained edgewise about the mandrel, and the pair of strips 44 and the pair of strips 48 alternate in forming the helical coils in the tubing 12, as the strips are wound on the mandrel 20.

The strips 44 and 48 can be initially merely tied onto the mandrel 20, the rotation of which provides for a continuous feed of strips 44 and 48 onto the mandrel 20 at the pressure face 30. The pressure of the face 30 on the strips 44 and 48 causes the tubing of helically wound strips 44 and 48 on the mandrel 20 to move toward the right as viewed in FIG. 1. Consequently, as the mandrel 20 is continuously rotated, helically wound filter tubing 12 is continuously formed on the mandrel 20, with one end of the tubing bearing against the pressure face 30 which exerts a reaction force on the tubing causing it to increase in length in a direction toward the right as viewed in FIG. 1.

By virtue of the angular spacing of the strips 44 and 48, in this case 180°, there is no interference of the strips 44 and 48 with each other, and the rate at which tubing is formed on the mandrel 20 is twice the rate at which it can be formed with only a single pair of strips 44 and 48 being fed to the mandrel. This is advantageous from the standpoint of the cost of manufacture of the filter elements 14, since twice the number can be made in the same time period heretofore required. FIG. 5 diagrammatically illustrates the feeding of the pair of strips 44 onto the mandrel at a point spaced 120° from the point at which the strips 48 are fed tangentially onto the mandrel 20. Consequently, in the embodiment of the invention illustrated in FIG. 5, a third pair of strips 50 can be fed onto the mandrel 20 at a point spaced 120° from the strips 44 and 48. A further increase in the rate of production of the filter tubing 12 can thus be obtained with the strip feeding arrangement illustrated in FIG. 5. When the apparatus 10 is adapted for feeding three pairs of strips 44, 48 and 50, the collar 26 is formed with three slots 40 spaced equally about the periphery of the collar 26 adjacent the pressure face 30, instead of the two slot arrangement shown in FIG. 3.

As best appears in FIG. 6, the mandrel 20 in the apparatus 10 of this invention is hollow so that it is provided with an internal passage 52. A conduit 54 connects the passage 52 to a source 56 of a pressurized fluid such as air. The only outlet for this fluid entering the passage 52 is an outlet opening 58 formed in the mandrel 20 at a position spaced from the pressure face 30. It is to be understood however that more than the single illustrated opening 58 can be used, so long as the openings are spaced substantially the same distance from the pressure face 30. The mandrel 20 (FIG. 6) is tapered so that it is of a larger size at its end 28 than at its end 34. Extended about the mandrel 20, and the tubing 12 formed thereon, is a heater 60, of any suitable type but preferably of a type capable of heating the tubing 12 dielectrically sufficiently fully to cure the resin in the paper strips 44 and 48. The heater 60 is mounted so that it can be moved in a direction axially of the mandrel 20, to position the heater closer to or further away from the pressure face 30 as desired, and a signal responsive means, indicated diagrammatically at 62, is provided for moving the heater 60. The means 62 can be any suitable motor provided with a control which, in response to predetermined signals moves the heater 60.

As the strips 44 and 48 which are helically wound on the mandrel 20 are heated, they shrink radially inwardly onto the mandrel 20. Consequently, the tightness with which the strips are contracted onto the mandrel 20 is determined by the position of the heater 60 axially of the mandrel 20. Stated otherwise, the larger the diameter of the portion of the mandrel 20 which is in radial alignment with the heater 60, the tighter the strips are contracted onto the mandrel 20. Consequently, if the heater 60 is located closer to the pressure face 30, the strips are contracted more tightly onto the mandrel 20. This results in a greater reaction force which the pressure face 30 exerts on the tubing being formed since the reaction force must be greater to overcome the frictional drag of the mandrel 20 on the tubing being formed. The greater the force exerted on the tubing by the pressure face 30, the more tightly the paper layers in the tubing are packed against each other on the mandrel 20 and thus the less porous is the tubing being formed. It can thus be seen that by adjusting the position of the heater 60 axially of the mandrel 20, the porosity of the tubing being formed can be continuously controlled. In the apparatus 10 of this invention, the fluid flowing through the mandrel outlet 58 must flow through the surrounding portion 68 of the tubing 12. Thus the rate of flow through outlet 58 is proportional to the porosity of tubing portion 68. This provides a constant indication of the porosity of the tubing 12 as it is being formed. The conduit 54 is connected by another conduit 64 to an indicator device 66 of any suitable type which indicates the rate of fluid flow through the outlet 58 in the mandrel 20. So long as a predetermined flow rate of fluid is maintained in the conduit 54 upstream from conduit 64, the indicator device 66 can be a well known manometer. A change in the indication on the indicator 66 thus indicates a change in the porosity of the tubing 12 as it is being formed. If desired, a suitable marking device can be employed to automatically mark an unsatisfactory portion 68 of the tubing 12 in response to an indication of this condition at the indicator 66. A suitable adjustment is then made in the position of the heater 60 to correct the undesirable porosity condition in the tubing 12. The unsatisfactory portion of the tubing 12 is then scrapped as soon as it is removed from the mandrel 20 and prior to any further processing.

In a preferred embodiment of the invention, the indicator 66 is connected to the heater signal receiving and moving means 62 by a line 70 to provide for automatic adjustment in the position of the heater 60 to correct the undesirable porosity conditions in the tubing 12. For example, if the indicator 66 senses that the tubing portion 68 is more porous than desired, the indicator 66 transmits a signal through the line 70 to the means 62 to provide for movement of the heater 60 a predetermined distance toward the pressure face 30. This will result in a tighter contraction of the crepe paper strips onto the mandrel 20 with a constant tighter packing of the strips and a reduction in the porosity. If the indicator 66 senses a condition in the tubing portion 68 of too little porosity, the means 62 will provide for movement of the heater 60 a predetermined distance away from the pressure face 30 to provide for a correction of this condition.

From the above description, it is seen that this invention provides improved apparatus 10 for manufacturing tubing 12 from which filter elements 14 are formed. The apparatus 10 provides for manufacture of the tubing at an increased rate with automatic control of the density of the tubing 12 as it is being formed. The apparatus 10 thus enables increased production, prevents scrapping of completely finished filter elements 14, and provides for an immediate adjustment of the resin cure setup so as to effectively prevent the manufacture of significant amounts of tubing which will have to be scrapped.

The term "continuous" is used herein to describe the rotation of the mandrel 20 and the production of the tubing 12. It is to be understood that as this term is used herein it refers to continued rotation or production over any time period, not necessarily an indefinite time period.

It will be understood that the apparatus for forming filter tubing which is herein disclosed and described is presented for purposes of explanation and illustration and is not intended to indicate limits of the invention, the scope of which is defined by the following claims.

I claim:

1. Apparatus for continuously forming porous filter tubing from strips of a crepe material characterized by its being windable helically into a tube form adjacent coils of which are partially bondable to each other in the presence of heat, said apparatus comprising a continuously rotating mandrel having a passage for fluid formed therein and an outlet for said passage in the periphery thereof, means for feeding at least one strip of said material of predetermined width edgewise onto said mandrel so that said strip will be wound helically onto said mandrel and form a tube thereon of progressively increasing length, means for introducing a pressurized fluid into said mandrel passage for flow through said outlet and the portion of said tube substantially radially aligned therewith, and means responsive to the rate of fluid flow through said outlet to thereby provide an indication of the rate of fluid flow through said tube portion and thus the porosity of said tube as the tube is being formed.

2. Apparatus according to claim 1 in which said mandrel is tapered and said apparatus further includes:

a pressure face substantially perpendicular to the axis of said tapered mandrel and located near the larger diametral end of said mandrel such that said pressure face bears against newly wound tubing and forces it along said mandrel in a direction extending away from said pressure face;

heating means movably mounted adjacent the filter tubing to bond portions of adjacent coils of tubing and contract them radially inward on said mandrel; and means for moving said heating means between said pressure face and said outlet such that the closer said heating means is to the said pressure face, the tighter the tubing is contracted onto the said tapered mandrel thereby increasing the pressure exerted by the said pressure face on the tubing thus more tightly packing the coils and reducing the porosity of the filter tubing.

3. Apparatus according to claim 2 further including control means operatively associating said rate of fluid flow responsive means with said heater moving means to maintain the newly forming tubing at a predetermined porosity.

4. In an apparatus for winding strips onto a mandrel to form edge-type filter tubing, a collar mounted adjacent the mandrel and containing a plurality of slots arranged in spaced relationship on the periphery of said collar with each slot terminating in a slit at one end of said collar, each slit being disposed such that a strip when passed through a slot and slit, is wound helically about the said mandrel, the width of a strip defining the wall thickness of the filter tubing.

5. Apparatus according to claim 4 wherein said slots are formed of sufficient width to permit a plurality of said strips to pass through each slot and slit and be wound onto said mandrel.

6. Apparatus according to claim 4 wherein said one end of said collar is formed into a pressure face to urge already wound strips together and force the tubing longitudinally along the mandrel, said slits terminating at said pressure face.

7. Apparatus for forming filter tubing from strip characterized by its being windable helically into a tube form, adjacent coils of which are partially bondable to each other in the presence of heat to form the wall of said tubing, said apparatus comprising:

a rotating mandrel, around which said tubing is formed;

a pressure face to exert a force against newly forming coils of tubing, compact them, and force them along said mandrel;

means supplying a pressurized fluid to a portion of the filter tubing wall which is spaced from said pressure face; and heating means adjacent said mandrel and mounted for movement between said pressure face and said fluid supplied portion of said tubing to bond adjacent coils of tubing and shrink them radially onto the mandrel;

means responsive to the rate of flow of said pressurized fluid through said portion of the filter tubing wall to move said heating means toward said pressure face upon an increase in the rate of fluid flow through said filter tubing portion and away from said pressure face upon a decrease of the rate of flow through said tubing portion, thereby maintaining the porosity of said forming filter tubing at a preselected level.

8. The combination according to claim 7 wherein said mandrel is tapered at least in part with the layer diametral portion near the most recently formed tubing.

9. In an apparatus for forming filter tubing from strips, a rotating mandrel, means for feeding a plurality of pairs of strips onto one end of the said mandrel so that the strips are wound helically onto said mandrel, and means directing each pair of strips in a side-by-side relationship with each other edgewise onto said mandrel in a direction substantially tangent to a point on the periphery of the mandrel, said directing means comprising a stationary collar extending about said mandrel at said one end of said mandrel, said collar being formed with a plurality of slots adjacent one end corresponding in number to the number of pairs of strips to be wound on said mandrel, each of said slots terminating in a slit in said one end of said collar, each slit being disposed such that a pair of strips when passed through a slot and slit, is wound helically about the said rotating mandrel, the width of a strip defining the wall thickness of the filter tubing.

References Cited

UNITED STATES PATENTS

| 1,773,382 | 8/1930 | Trundle | 156—425 |
| 3,111,442 | 11/1963 | Voisin | 156—429 XR |
| 3,320,044 | 5/1967 | Cole et al. | 156—184 XR |

JOHN T. GOOLKASIAN, Primary Examiner

M. E. McCAMISH, Assistant Examiner

U.S. Cl. X.R.

156—378, 431, 446, 481